United States Patent [19]
Morris

[11] Patent Number: 5,226,822
[45] Date of Patent: Jul. 13, 1993

[54] INTERACTIVE ELECTRONIC GAME BOOK

[75] Inventor: Michael J. Morris, Westport, Conn.

[73] Assignee: Joshua Morris Publishing Inc., Wilton, Conn.

[21] Appl. No.: 887,349

[22] Filed: May 21, 1992

[51] Int. Cl.⁵ ............................................. A63H 5/00
[52] U.S. Cl. ................................... 434/359; 434/317
[58] Field of Search .................. 373/237, 287, 138 A; 434/169, 308, 309, 317; 446/397

[56] References Cited

U.S. PATENT DOCUMENTS

| | | | |
|---|---|---|---|
| 4,474,557 | 10/1984 | Clossey | 434/153 |
| 4,824,376 | 4/1989 | Arash | 434/330 |
| 4,997,374 | 3/1991 | Simone | 434/317 |
| 5,055,053 | 10/1991 | Hyman | 434/343 |
| 5,087,043 | 2/1992 | Billings et al. | 273/157 R |

FOREIGN PATENT DOCUMENTS

WO91/06090 5/1991 World Int. Prop. O. .

Primary Examiner—Richard J. Apley
Assistant Examiner—Glenn E. Richman
Attorney, Agent, or Firm—Howrey & Simon

[57] ABSTRACT

An interactive electronic game book is disclosed in which the pages of the book form game boards for educational or amusement-type games. An electronic randomizer unit is affixed to the back cover of the game book for providing randomly-selected instructions directing the games and allowing the player to interact with the game board pages. The randomizer unit may sequentially operate and randomly select one of a plurality of lights, which correspond to one of a set of game instructions provided on a page adjacent to the randomizer. Several different types of game boards may be contained within a single volume.

13 Claims, 5 Drawing Sheets

INTERACTIVE ELECTRONIC GAME BOOK

BACKGROUND OF THE INVENTION

The invention relates generally to interactive games and, more particularly, to an interactive game book in which an electronic circuit device is used to provide random instructions for directing an educational or amusement game provided on the pages of the book.

Games and learning devices are more fun and more effective when they are both easy to use and have features that engage the attention of the user. Simple electronic devices have been used with games and learning devices in the past. Such games have taken a variety of forms. For example, PCT Publication No. WO 91/06090 (Billings et al.), discloses an audio-visual game with both an electronic portion and a graphic portion. A series of buttons are provided, each of which selectively generates one of a plurality of sounds. If desired, the operator may press one of several buttons while reading the graphic portion, thereby generating a sound that corresponds to the picture on or next to the button.

Other games and amusement devices have used electronic devices in a variety of different forms. See, for example, U.S. Pat. No. 4,474,557 (Clossey), U.S. Pat. No. 4,824,376 (Arash), U.S. Pat. No. 5,055,053 (Hyman), U.S. Pat. No. 5,087,043 (Billings et al.), and U.S. Pat. No. 4,997,374 (Simone).

None of these known devices provide an interactive electronic game book whose pages form one or more game boards that use an electronic device having a random selection capability for providing instructions to guide or direct the playing of the game.

SUMMARY OF THE INVENTION

Accordingly, the invention is directed to providing an interactive game book in which an electronic device randomly provides instructions such that the user can relate and follow the randomly selected information indicated by the electronic device to one of the game boards provided on the pages of the book. For example, when the book is opened, a complete game board, such as that of a counting game or a board game featuring attractive graphics and artwork, is exposed. Pushing the actuating button of an electronic device triggers an electronic circuit that sequentially causes lights to flash and sounds to be generated until one of the lights has been randomly selected by repeatedly flashing on and off or remaining on for a predetermined time period. During the predetermined time period, different sounds may be generated by the electronic device.

The randomly-selected light corresponds to a particular image or instruction for that game, for example, animals or objects to locate and count in the drawing, or the number and/or the direction of spaces to be moved along a path on the game board. The randomizing electronic unit interactively directs the playing of the game, and thus makes the game more interesting to play by randomly relaying the required instructions to the player. The book-like configuration of the invention also provides for a variety of different types of games in a single volume, thereby increasing the interest level and learning opportunities.

DETAILED DESCRIPTION

Figure 1:
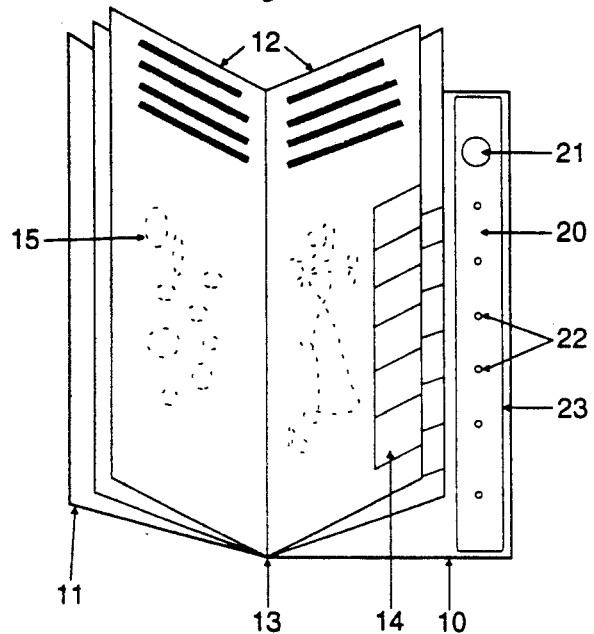
FIG. 1 is a schematic top view of an interactive electronic game book constructed according to the principles of the invention, illustrating the book-like format of the invention.

The interactive learning game book 1 of the invention is seen in a partially open position in FIG. 1. The game book 1 has a back cover 10, which is connected to the front cover 11 by a binding hinge 13 of conventional and well-known design in the art. Binding hinge 13 also serves to connect a plurality of pages 12, which form the game boards of the book, such that the pages can easily be turned. The front and back covers may display text and/or graphics 15 featuring a title or other attractive artwork. An electronic randomizer unit 20 is contained within a box-like housing 23 made of plastic or other suitable material, and is mounted by adhesive or other affixing means to the back cover 10 as shown in FIGS. 1-3.

Each page 12 also bears text or graphics 15 that form with an adjacent page a single game board when the book is opened. When opened, a series of instruction boxes 14 positionally correspond with a series of lights 22 provided on the face of the electronic randomizer unit 20. The electronic randomizer unit 20 also includes on its face an actuating button 21. When the button 21 is pressed, an electronic circuit 30, which may include a stepper switch, is triggered and the lights 22 sequentially flash for a short time before one light is randomly selected, by repeatedly flashing or remaining lit, for a predetermined time period. Of course, the lights may randomly, instead of sequentially, flash during the short time period. As is well known in the art, music or other sound effects also may be generated by the circuit 30 in the electronic randomizer unit 20 while the lights flash. Once a light is randomly selected, the sounds may change to different sounds, which last only during a predetermined time period, for reasons to be discussed subsequently.

Figure 4:
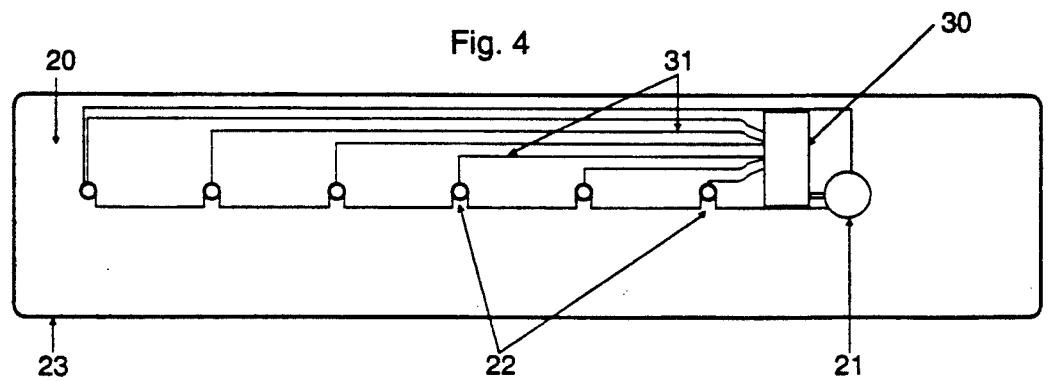
FIG. 4 is a schematic plan view of the electronic randomizer unit of the invention with its back cover removed.

The electronic circuit 30 that accomplishes the above-described functions is of conventional construction that is well-known in the electronics art and forms no part of the present invention. For example, a randomizer unit having a circuit that performs these functions is currently available from Enviro-Men Productions (HK) in Kowloon, Hong Kong. As shown schematically in FIG. 4, the randomizer circuit 30 is linked by connecting wires 31 to operate each of the lights 22 in the manner discussed above. The circuit is also connected to the actuating button 21. A standard, conventional battery or other power supply (not separately shown) is also provided. The circuit and wiring are contained within the body 23 of the electronic randomizer unit 20 to protect the electronics from exposure or damage.

Figure 3:
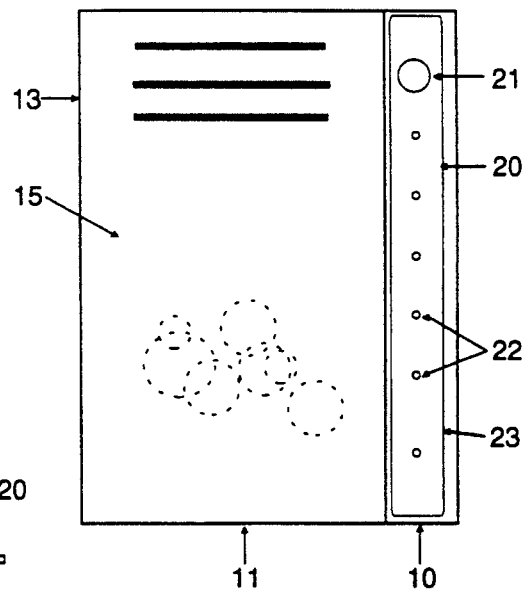
FIG. 3 is a schematic plan view of the game book of FIGS. 1-2 in a closed position.
Figure 2:
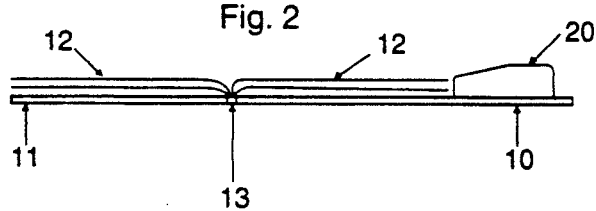
FIG. 2 is a schematic side view of the game book of FIG. 1 in an open and flat position.

In the particular embodiment illustrated in FIGS. 1-3, the width of pages 12 and front cover 11 are less than the width of back cover 10. In this way, pages 12 and front cover 11 do not overlap or cover the electronic randomizer unit 20 when the book is closed. Rather, pages 12 are of a width such that they generally align with the unit 20, with edge of the page 12 distal the binding 13 being disposed adjacent the electronic randomizer unit 20. Each of the informational boxes 14 printed along the edges of pages 12 aligns with a respective one of the lights 22 of the electronic randomizer unit 20.

After the electronic randomizer unit 20 has selected one of the lights 22 to flash or remain lit, the player looks to the corresponding information box 14 for the instructions required to interact with the game. Depending upon the particular game, the instructions may provide directions concerning spaces to move, items to find and/or count, or the like, on the open adjacent pages 12 that form the game board.

The book can be arranged so that by turning to a different page, a new game is presented that has its own set of instruction boxes 14 corresponding with the particular graphics and objects of that game. In this way, a variety of games can be offered within a single volume of the book, thereby increasing the interest levels and learning opportunities that the game can provide.

Figure 5:
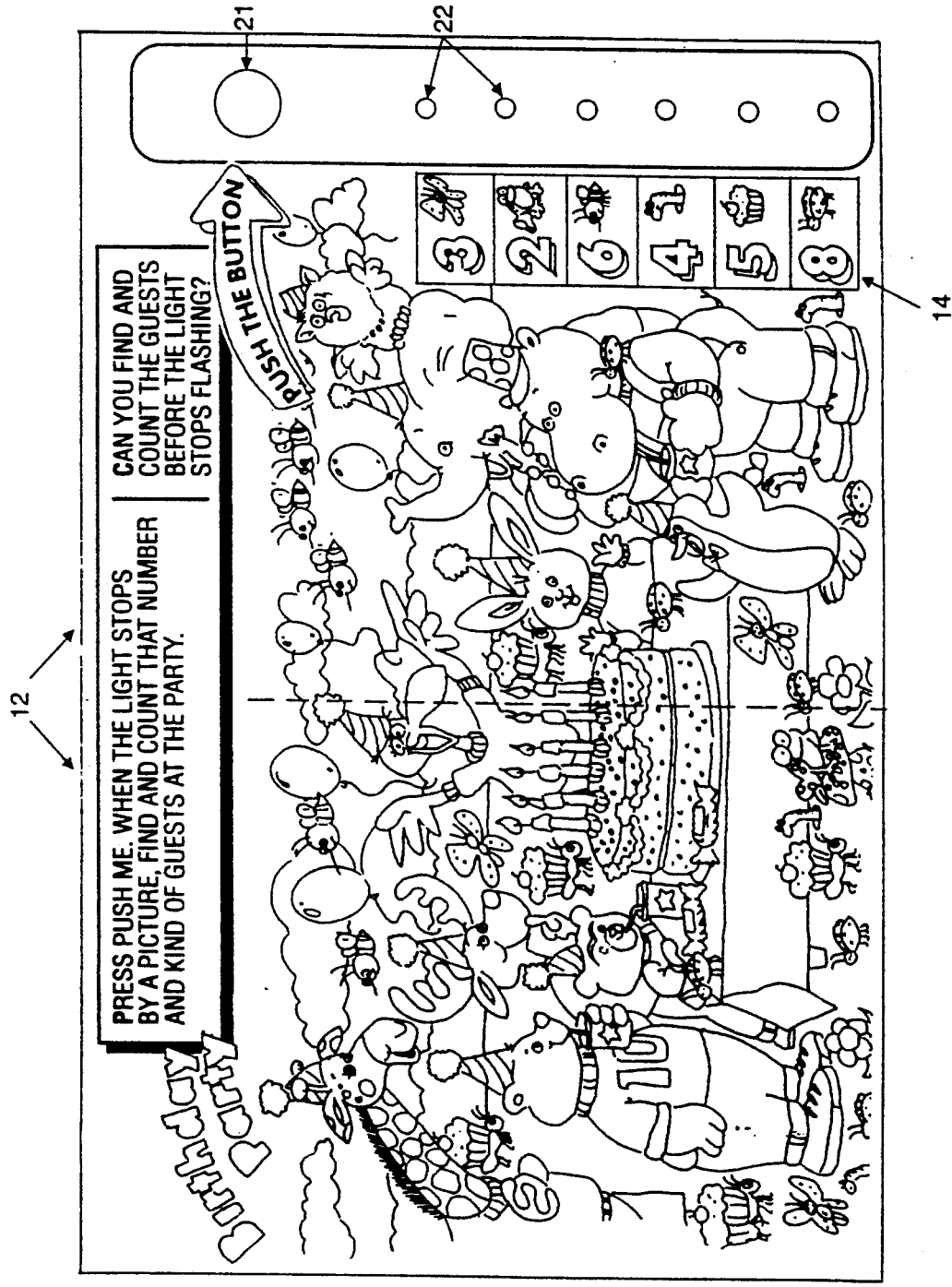
FIGS. 5-7 are plan views of sample illustrated game boards with the game book in the open position.

One particular educational counting game is shown in FIG. 5. The operation of this game should be self explanatory from the above description. Play is initiated by pressing the actuating button 21. A first series of sounds is generated by the circuit as the lights flash during the random selection process. After the electronic circuit has randomly selected one of the lights 22 in the manner discussed above, the sounds may change to music or the like and the player refers to instructions in the corresponding information box 14. In this game, each box 14 contains both a number and a drawing of an animal or other object. The player then searches the illustrated pages 12 that forms the game board and attempts to locate and count that particular animal or object. For example, the player might be looking for five "moving cupcakes." The pre-determined time period in which the selected light flashes or remains lit provides a measure or time limit for accomplishing the instructed task. The music may continue only for this time period as an audible indication of the time limit.

Figure 6:
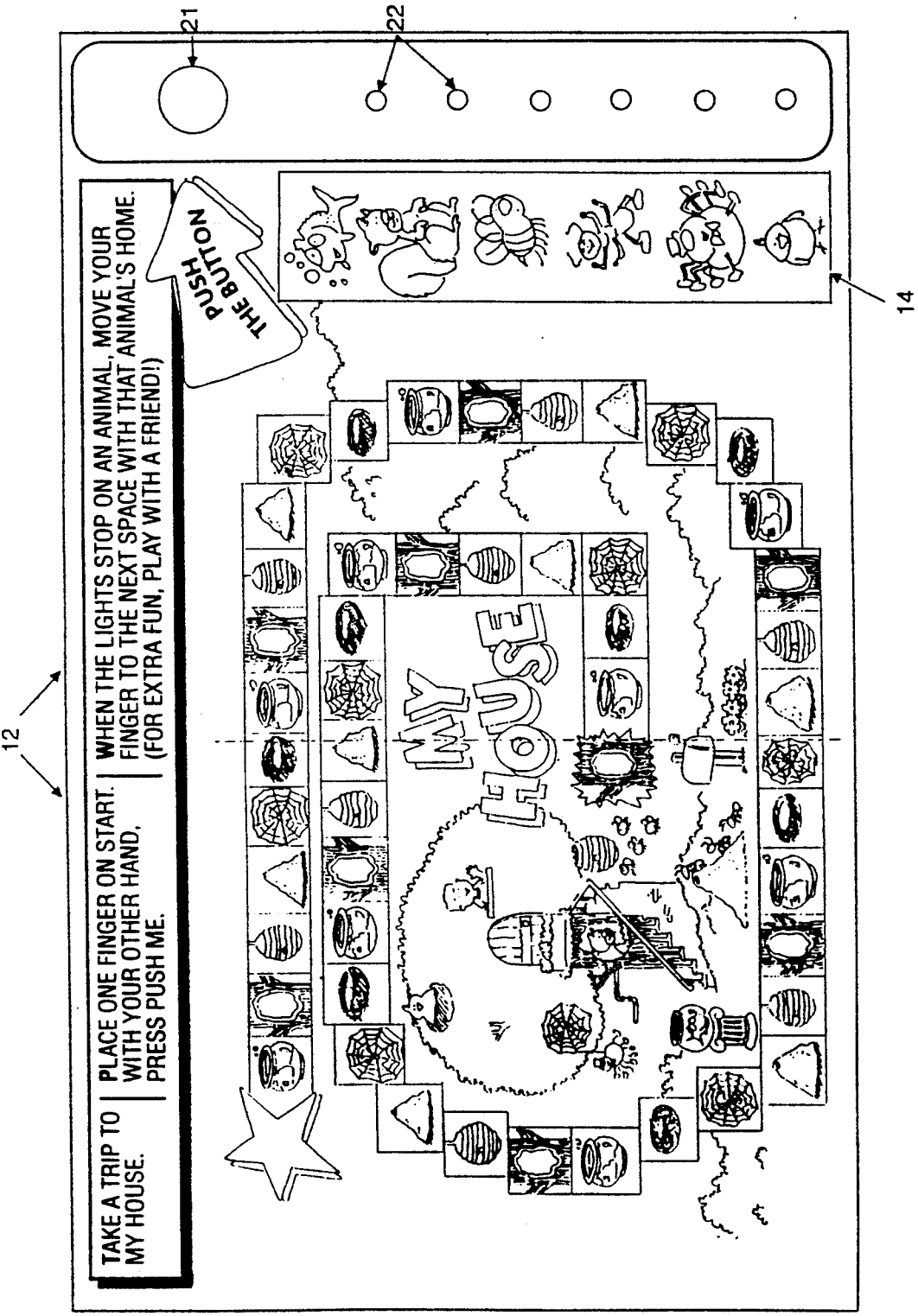
Figure 7:
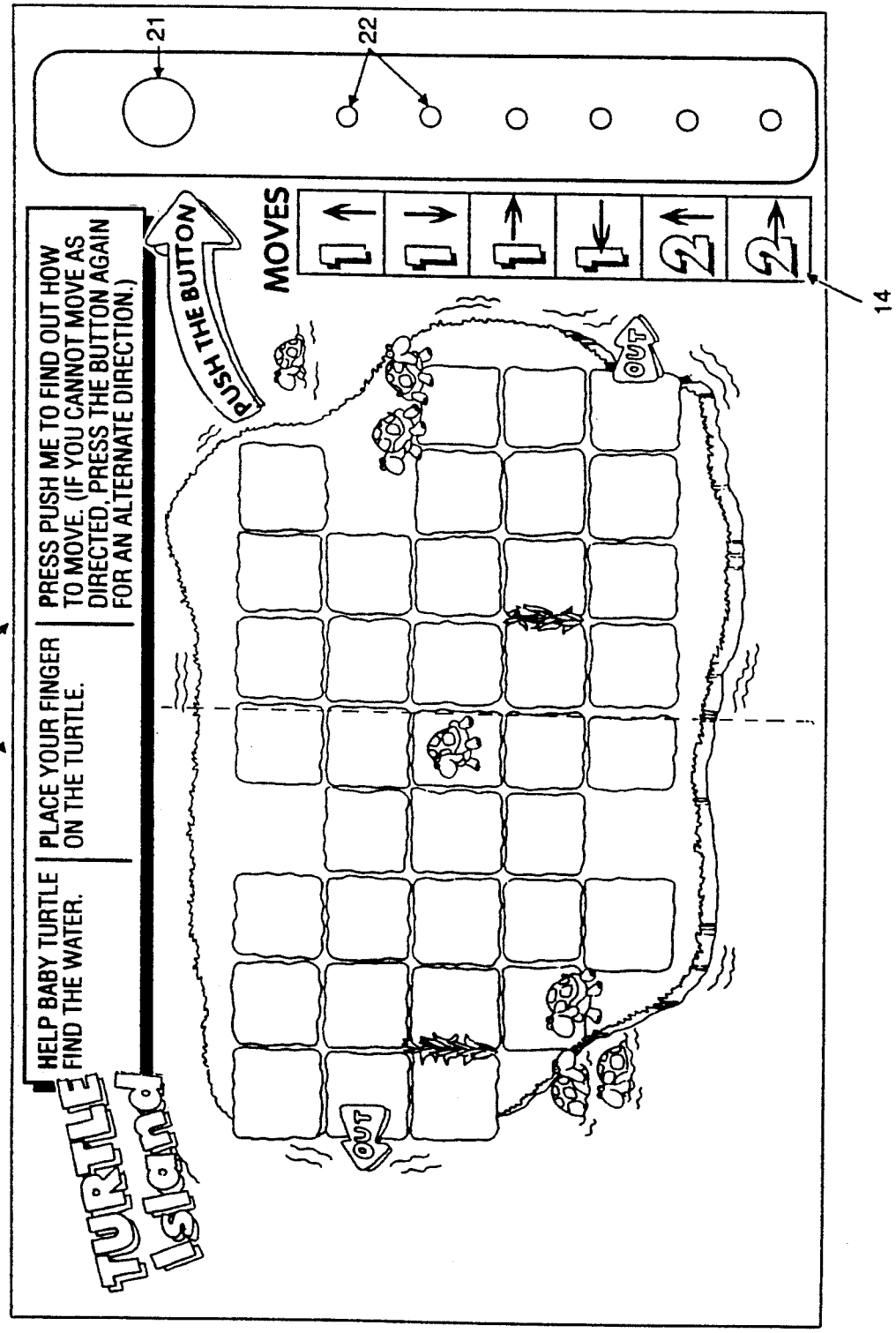

Other possible games are shown in FIGS. 6 and 7 and may be incorporated into the pages 12 of the game book 1. FIGS. 6 and 7 show board games in which the randomizer unit indicates instructions directing the player to move a certain amount of spaces and/or in a given direction, with the object being to reach the finish (FIG. 6) or travel through a maze (FIG. 7).

Figure 8:
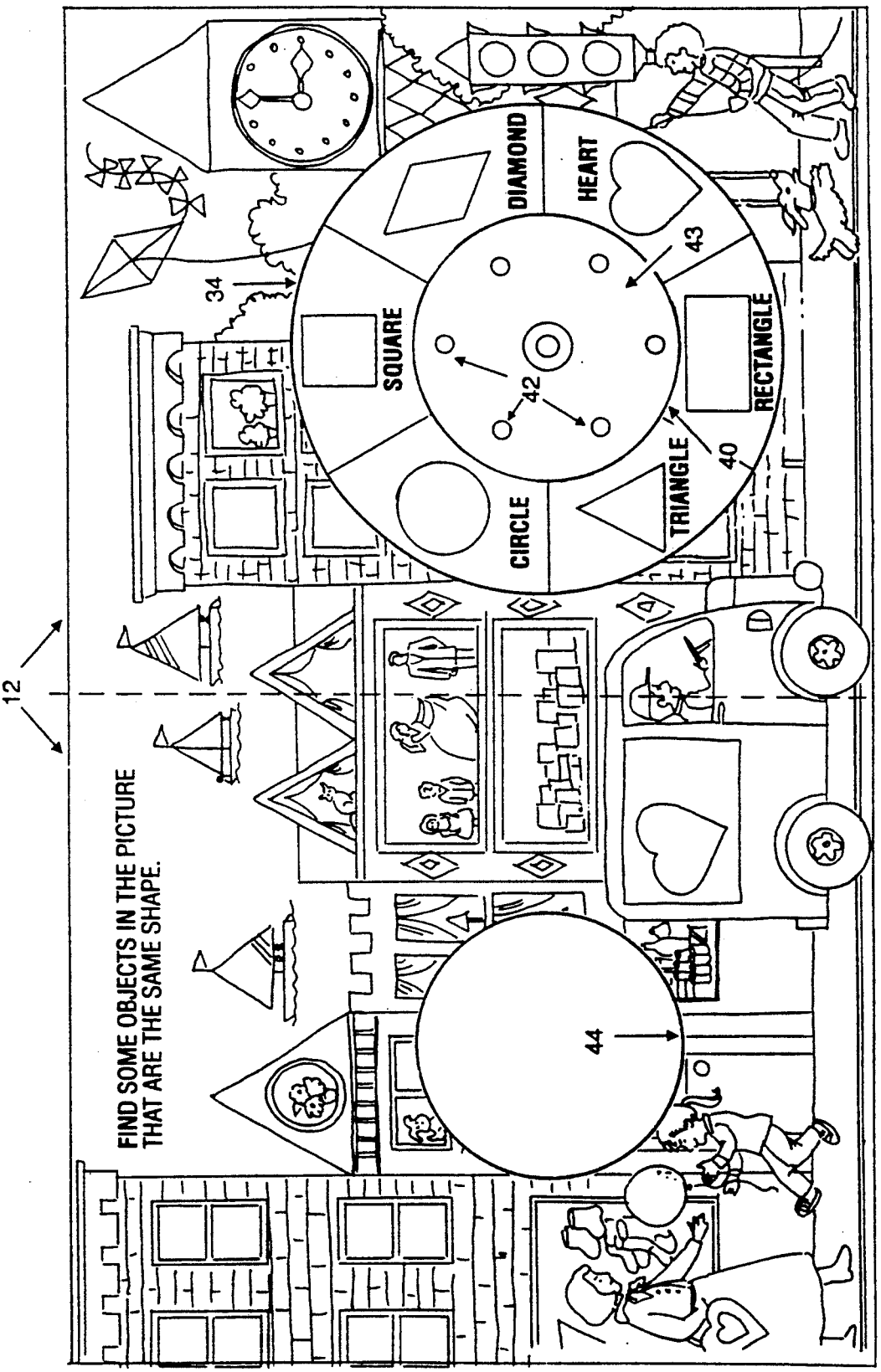
FIG. 8 is a plan view of a sample illustrated game board showing a circular, electronic randomizer unit.

FIGS. 1-7 illustrate a linear randomizer unit arranged at the edge of the book. Of course, the randomizer may take numerous other configurations, such as circular, semi-circular or irregularly shaped. An example of a game book employing a circular randomizer is shown in FIG. 8. Randomizer 40 has a circular housing 43 mounted onto the back cover of the game book. Lights 42 are arranged about the periphery of the face of the housing 43, while the actuating button is disposed near the center of the housing. The construction and function of the randomizer 40 otherwise is the same as that discussed above. In this embodiment the informational boxes 34 are formed on each page in a ring-like fashion, such that each box corresponds to one of the lights 42. Each page has a hole 44 through which the circular housing 43 may extend to permit the pages of each game board to be turned and lie flush. Thus, more than one game board may be provided in this game book, as in the other embodiments.

What is claimed is:

1. An interactive game book comprising:
    a support member;
    a plurality of pages secured to the support member, said plurality of pages forming a game board for a game and including graphic information and a set of instructions for directing how to play the game represented on the game board; and
    an electronic randomizer secured to the support member for randomly indicating one of said set of instructions to be followed for playing the game, wherein said randomizer includes an actuator, a series of indicators having two different states, with each indicator being associated with one of said set of instructions, and means for randomly changing the state of one of said indicators for a predetermined time period in response to operation of said actuator, thereby, indicating that the instruction adjacent the indicator having the changed state is to be followed.

2. The game book of claim 1 wherein said indicators are lights having on and off conditions and said means for randomly changing the state of one of the lights comprises an electronic circuit.

3. The game book of claim 2 wherein said electronic circuit includes a switch operable in response to activation of said actuator to sequentially turn on and then off each of said lights and then repeatedly turn on and off only one of said lights, thereby indicating that the instructions adjacent said one light are to be followed.

4. The game book of claim 3 wherein said electronic circuit includes means for generating first sounds in response to operation of said actuator.

5. The game book of claim 4 wherein said sound generating means produces second sounds different from said first sounds during the time period said one light is repeatedly turned on and off.

6. The game book of claim 2 wherein said electronic circuit includes a switch operable in response to activation of said actuator to sequentially turn on and then off each of said lights for a first time period and then turn on only one of said lights for a second time period greater than said first time period, thereby indicating that the instructions adjacent said one light are to be followed.

7. The game book of claim 6 wherein said electronic circuit includes means for generating first sounds in response to operation of said actuator.

8. The game book of claim 7 wherein said sound generating means produces second sounds different from said first sounds during the second time period.

9. The game book of claim 1 wherein said plurality of pages comprises a plurality of pages defining different game boards for a plurality of different games.

10. The game book of claim 9 further comprising a front cover, a back cover defining said support member, and a binding disposed between said front and back covers permitting folding of at least one of said covers to open and close the game book, and wherein said binding secures the pages to the game book and said randomizer is disposed on said back cover in a position freely permitting opening and closing of the game book and turning of the pages.

11. The game book of claim 10 wherein at least one of the games includes a game board defined by two adjacent pages of the game book when the game book is in an open position, with one of said two adjacent pages lying over the front cover and the other of said two adjacent pages lying over the back cover, said other page having a first edge adjacent the binding and a second edge adjacent the randomizer, said randomizer being spaced from said second edge, and said set of instructions being located on said other page adjacent said second edge.

12. The game book of claim 10 wherein said randomizer comprises a circular housing, said set of instructions is disposed in a ring-like fashion around the circular housing, and said plurality of pages has a hole through which the circular housing may extend.

13. The game book of claim 1 wherein the game is selected from the group consisting of an educational game and a board game.

* * * * *

UNITED STATES PATENT AND TRADEMARK OFFICE
CERTIFICATE OF CORRECTION

PATENT NO. : 5,226,822

DATED : Jul. 13, 1993

INVENTOR(S) : Michael J. Morris

It is certified that error appears in the above-identified patent and that said Letters Patent is hereby corrected as shown below:

```
Col. 4,  line 7, delete "said" and insert therefore --each of said--;
         line 21, delete "adjacent" and insert therefore --associated with--;
         line 46, delete "adjacent" and insert therefore --associated with--;
Col. 6,  line 4, delete "said" and insert therefore --each of said--.
```

Signed and Sealed this

Sixteenth Day of August, 1994

Attest:

BRUCE LEHMAN

Attesting Officer

Commissioner of Patents and Trademarks